(12) United States Patent
Sun (10) Patent No.: US 8,639,218 B2
(45) Date of Patent: Jan. 28, 2014

(54) COMMUNICATION SYSTEM WITH ACCESS MANAGEMENT MECHANISM AND METHOD OF OPERATION THEREOF

(75) Inventor: XiZhen Sun, Beijing (CN)

(73) Assignee: Telenav, Inc., Sunnyvale, CA (US)

( * ) Notice: Subject to any disclaimer, the term of this patent is extended or adjusted under 35 U.S.C. 154(b) by 287 days.

(21) Appl. No.: 13/267,817

(22) Filed: Oct. 6, 2011

(65) Prior Publication Data

US 2013/0090085 A1 Apr. 11, 2013

(51) Int. Cl.
*H04M 1/66* (2006.01)

(52) U.S. Cl.
USPC .......... 455/410; 455/411; 455/415; 455/560; 455/566; 455/456.1

(58) Field of Classification Search
USPC ............. 455/410, 411, 415, 560, 566, 456.1; 379/142.14, 142.17, 245, 142.2, 142.6
See application file for complete search history.

(56) References Cited

U.S. PATENT DOCUMENTS

| | | | |
|---|---|---|---|
| 7,324,636 B2 | 1/2008 | Sauvage et al. | |
| 7,366,116 B2 | 4/2008 | Wynn | |
| 8,238,949 B1* | 8/2012 | Figarella et al. | 455/466 |
| 2007/0121884 A1 | 5/2007 | Sin et al. | |
| 2008/0200143 A1* | 8/2008 | Qiu et al. | 455/404.2 |
| 2010/0128699 A1 | 5/2010 | Yang et al. | |

* cited by examiner

*Primary Examiner* — Manpreet Matharu (74) *Attorney, Agent, or Firm* — IP Investment Law Group (57) ABSTRACT

A method of operation of a communication system includes: registering a primary communication identification for identifying a reception device; generating a map communication identification associated with the primary communication identification; generating an authorization condition for the map communication identification for contacting the reception device; and controlling a device access based on the authorization condition for accepting an access request to the reception device with the map communication identification instead of the primary communication identification.

18 Claims, 5 Drawing Sheets

COMMUNICATION SYSTEM WITH ACCESS MANAGEMENT MECHANISM AND METHOD OF OPERATION THEREOF

TECHNICAL FIELD

The present invention relates generally to a communication system, and more particularly to a system for communication management.

BACKGROUND ART

Modern portable consumer and industrial electronics, especially client devices such as communication systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Communication systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

Thus, a need still remains for a communication system with communication management. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a communication system including: registering a primary communication identification for identifying a reception device; generating a map communication identification associated with the primary communication identification; generating an authorization condition for the map communication identification for contacting the reception device; and controlling a device access based on the authorization condition for accepting an access request to the reception device with the map communication identification instead of the primary communication identification.

The present invention provides a communication system, including: a registration module for registering a primary communication identification for identifying a reception device; a mapping module, coupled to the registration module, for generating a map communication identification associated with the primary communication identification; a condition generator module, coupled to the mapping module, for generating an authorization condition for the map communication identification for contacting the reception device; and a gatekeeper module, coupled to the condition generator module, for controlling a device access based on the authorization condition for accepting an access request to the reception device with the map communication identification instead of the primary communication identification.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
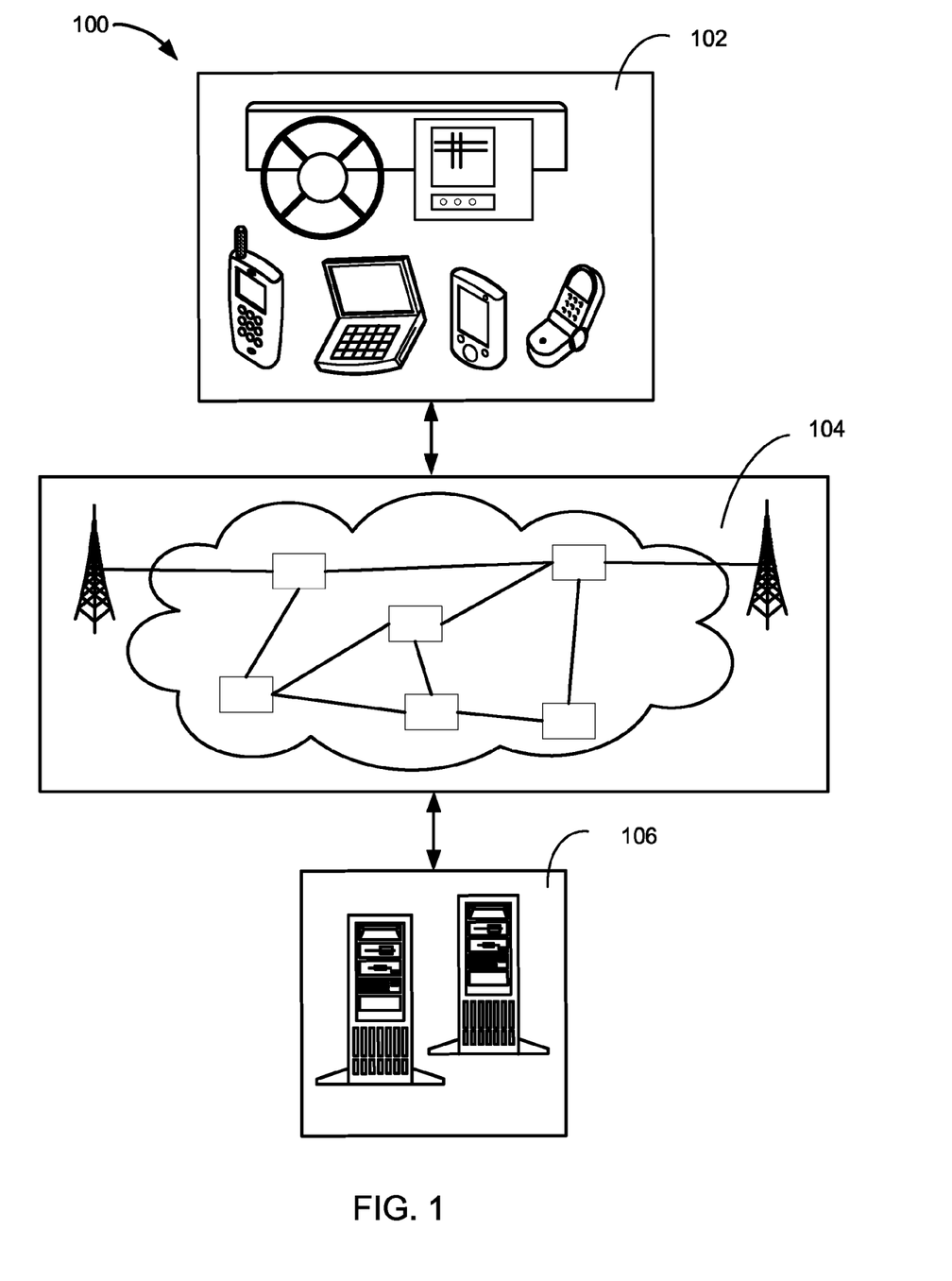
FIG. 1 is a communication system with access management mechanism in an embodiment of the present invention.

Referring now to FIG. 1, therein is shown a communication system 100 with access management mechanism in an embodiment of the present invention. The communication system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic communication system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the communication system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10(™) Business Class mainframe or a HP ProLiant ML(™) server. Yet another example, the second device 106 can be a particularized machine, such as a portable computing device, a thin client, a notebook, a netbook, a smartphone, personal digital assistant, or a cellular phone, and as specific examples, an Apple iPhone(™), Palm Centro(™), or Moto Q Global(™).

For illustrative purposes, the communication system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the communication system 100 is shown with the second device 106 and the first device 102 as end points of the communication path 104, although it is understood that the communication system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof Referring now to FIG. 2, therein is shown an example of establishing a device access 234 to a reception device 204 via a map communication identification 206 instead of a primary communication identification 208. The reception device 204 is as defined by first device 102 of FIG. 1 or the second device 106 of FIG. 1. The device access 234 is defined as the connection to the reception device 204 for establishing communication with the reception device 204. An access request 202 is defined as a request for establishing communication with the reception device 204 via the map communication identification 206.

Figure 2:
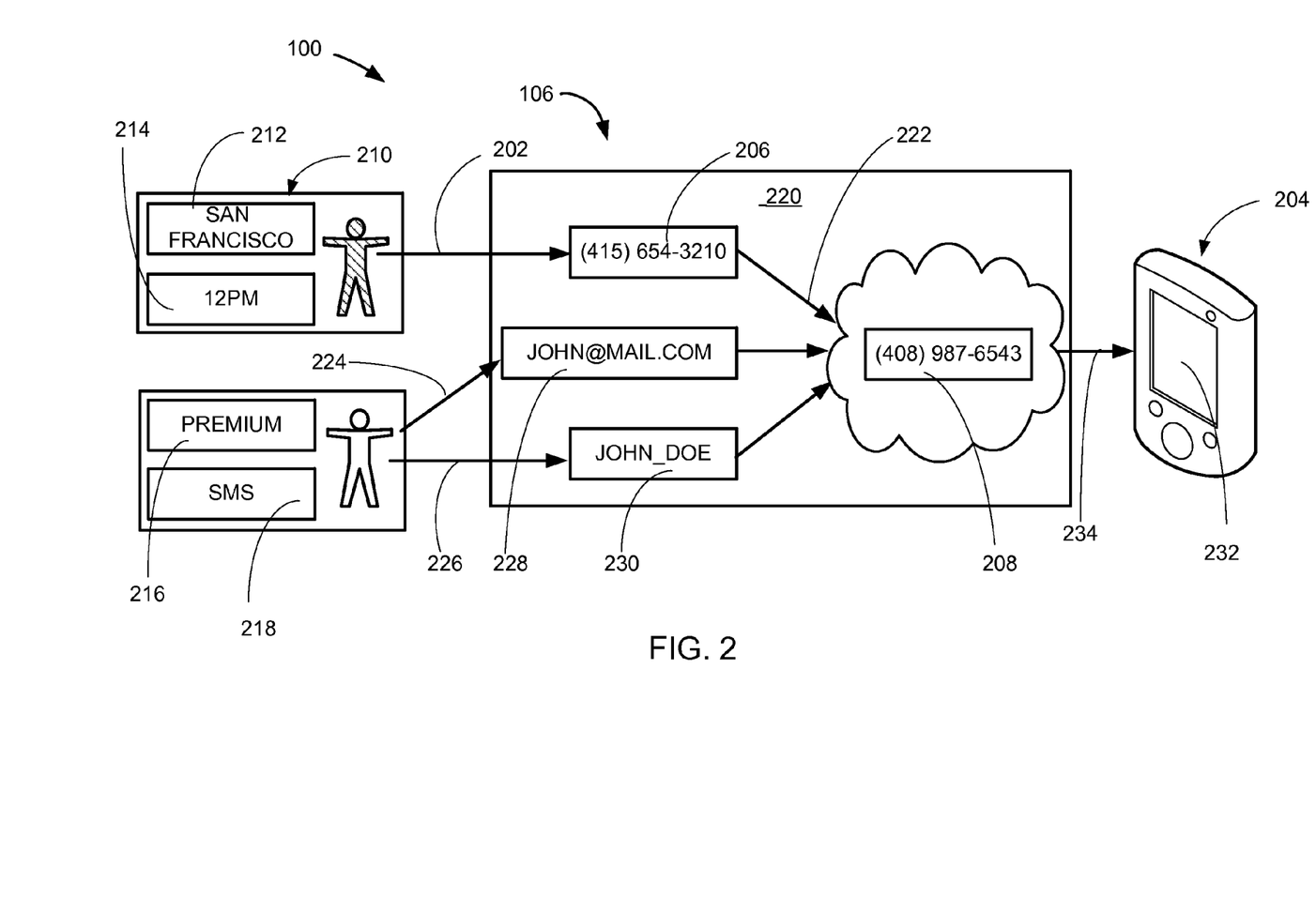
FIG. 2 is an example of establishing a device access to a reception device via a map communication identification instead of a primary communication identification.

The primary communication identification 208 is defined as the contact information assigned to the reception device 204 for communicating with the reception device 204. For example, the primary communication identification 208 can include a telephone number, an email address, an instant messaging login name, a short message service (SMS) identification, or a combination thereof For further example, the primary communication identification 208 can be permanent contact information.

The map communication identification 206 is defined as the contact information assigned to the primary communication identification 208 for concealing the primary communication identification 208 when contacting the reception device 204. For example, the map communication identification 206 can include a telephone number, an email address, an instant messaging identification, a short message service (SMS) identification, or a combination thereof For further example, the map communication identification 206 can be temporary, changeable contact information.

For a specific example, the map communication identification 206 can be assigned to the primary communication identification 208 for accessing the reception device 204. For example, instead of a caller calling the primary communication identification 208 of "(408) 987-6543" for contacting the reception device 204, the caller can call the map communication identification 206 of "(415) 654-3210" for contacting the reception device 204. Moreover, the caller will not know the primary communication identification 208, and can contact the reception device 204 via the map communication identification 206.

An authorization condition 210 is defined as a factor or a combination of factors that will be considered to permit the access request 202 via the map communication identification 206 for accessing the reception device 204. For example, the authorization condition 210 can include a transmitter region 212, a time period 214, a subscription status 216, a transmission mode 218, or a combination thereof.

The transmitter region 212 is defined as the physical location where the transmitter attempts to establish contact with the reception device 204. The transmitter is defined as a person, an external device, or a combination thereof that can send the access request 202 for contacting the reception device 204.

The time period 214 is defined as a specific time of the day, duration of time, or a combination thereof that the transmitter is permitted to access the reception device 204. The subscription status 216 is defined as the access level authorized for the transmitter to establish communication with the reception device 204. The transmission mode 218 is defined as the mode of communication permitted to establish communication with the reception device 204.

An access control 220 is defined as the gatekeeper functionality within the communication system 100 that generates a contact authorization 222 based on considering the authorization condition 210 for determining whether the access request 202 can be authorized to access the reception device 204. The gatekeeper functionality is the ability by the communication system 100 to make decision based on the authorization condition 210 for which of the access request 202 can be granted to access the reception device 204. The contact authorization 222 is defined as the permission to access the reception device 204 granted based on the access control 220 by the communication system 100.

For example, the communication system 100 can generate the access control 220 based on the authorization condition 210. For a specific example, the access control 220 can be based on the transmitter region 212. A transmitter can be located in San Jose, Calif. (Calif.). However, the transmitter region 212 used as the authorization condition 210 for the transmitter to contact the reception device 204 via the map communication identification 206 can be limited to San Francisco, Calif. The access control 220 can be used by the communication system 100 to deny the access request 202 by the transmitter if the transmitter attempts to contact via the map communication identification 206 from San Jose, Calif.

For another example, the access control 220 can be based on the combination of the time period 214 and the transmission mode 218. The authorization condition 210 representing the time period 214 can be 8 AM to 10 AM daily. The authorization condition 210 representing the transmission mode 218 can be SMS. If the transmitter attempts to contact the reception device 204 via the map communication identification 206 at 9 AM with SMS, the communication system 100 can grant the contact authorization 222 based on the access control 220 to access the reception device 204.

For another example, the access control 220 can be based on the subscription status 216. The subscription status 216 used as the authorization condition 210 can be "premium." The other status for the subscription status 216 can represent "basic," which offers less flexibility than the "premium" status for accessing the reception device 204. With the premium status as the subscription status 216, the communication system 100 can authorize the transmitter to communicate with the reception device 204 with greater flexibility.

For a specific example, the transmitter with the premium status can have no restriction on the time period 214 or the transmitter region 212 for contacting the reception device 204 via the map communication identification 206. For a different example, the communication system 100 can switch the transmission mode 218 with the premium status. More specifically, a first transmission mode 224 can represent instant messaging and a second transmission mode 226 can represent emailing.

For example, the transmission mode 218 can include the first transmission mode 224 and the second transmission mode 226. If the transmitter contacts the reception device 204 via the first transmission mode 224 but receives no response in a predefined time period, the communication system 100 can switch the transmission mode 218 to the second transmission mode 226 representing an email to access the reception device 204.

By switching the transmission mode 218, the communication system 100 can switch from a first map communication identification 228 to a second map communication identification 230 for the map communication identification 206. For example, the map communication identification 206 can include the first map communication identification 228 and the second map communication identification 230. Continuing from the previous example, if the transmitter cannot access the reception device 204 via contacting the first map communication identification 228 representing an instant messaging login name, the communication system 100 can authorize the transmitter to access the reception device 204 via contacting the second map communication identification 230 representing an email address.

For another example, the communication system 100 can offer the "highest available throughput" to offer the map communication identification 206 with the greatest bandwidth to access the reception device 204. More specifically, the transmitter can communicate via the first map communication identification 228 to access the reception device 204. If the bandwidth for the second map communication identification 230 is better than the first map communication identification 228, the communication system 100 can switch to the second map communication identification 230 for the transmitter to access the reception device 204 via the second map communication identification 230.

The communication system 100 can generate a device command 232. The device command 232 is defined as an instruction to the reception device 204 to execute functionalities available on the reception device 204. For example, the device command 232 can represent "displaying a travel route to the target destination" to instruct the reception device 204 to display the travel route.

Figure 3:
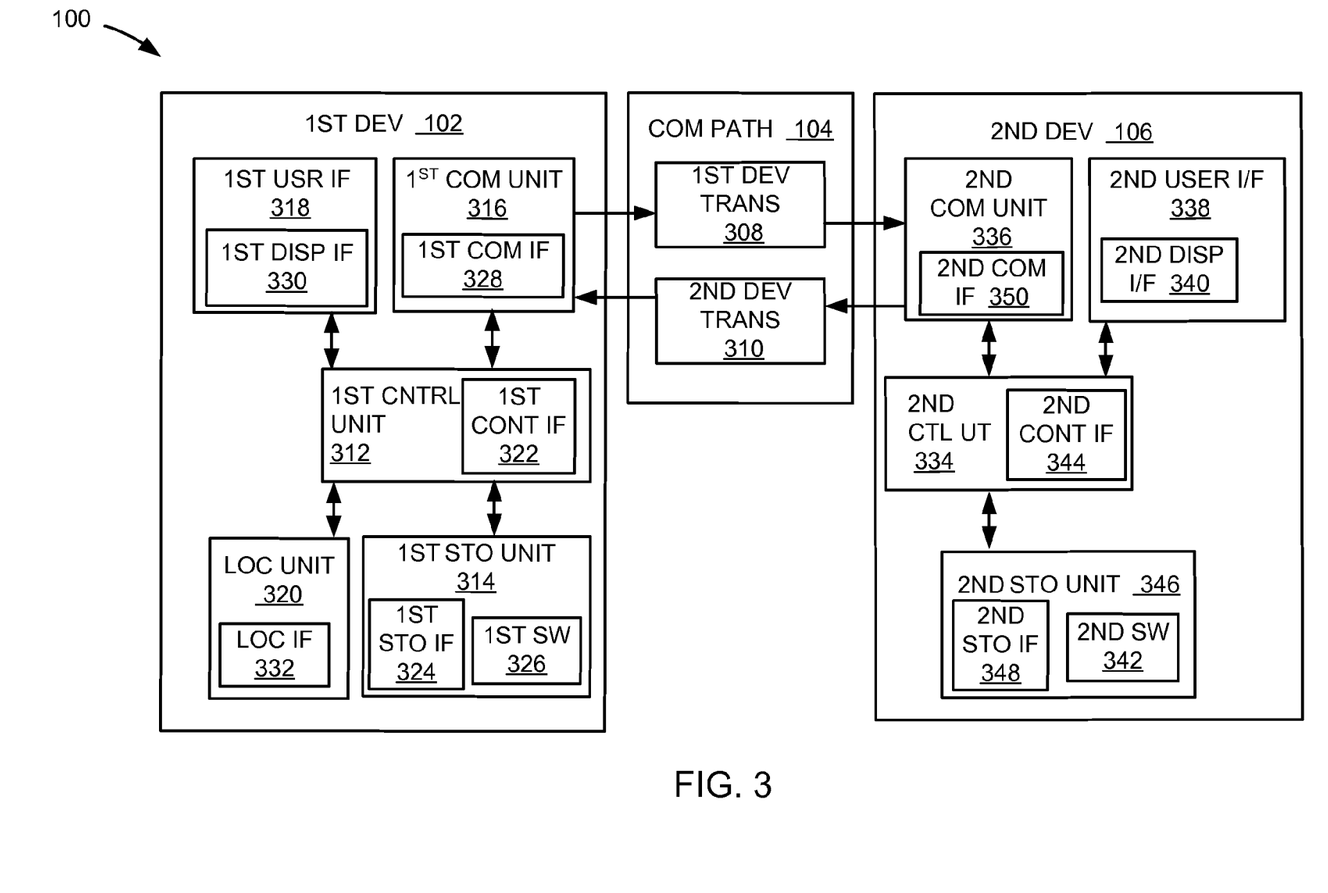
FIG. 3 is an exemplary block diagram of the communication system.

Referring now to FIG. 3, therein is shown an exemplary block diagram of the communication system 100. The first device 102 can send information in a first device transmission 308 over the communication path 104 to the second device 106. The second device 106 can send information in a second device transmission 310 over the communication path 104 to the first device 102.

For illustrative purposes, the communication system 100 is shown with the first device 102 as a client device, although it is understood that the communication system 100 can have the first device 102 as a different type of device. For example, the first device 102 can be a server.

Also for illustrative purposes, the communication system 100 is shown with the second device 106 as a server, although it is understood that the communication system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first device 102 can be similarly described by the first device 102.

The first control unit 312 can include a first control interface 322. The first control unit 312 can execute a first software 326 to provide the intelligence of the communication system 100. The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial communication system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations external to the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, or any combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, or any combination thereof to provide data and communication inputs.

The first user interface 318 can include a first display interface 330. The first display interface 330 can include a display, a projector, a video screen, a speaker, or any combination thereof The first control unit 312 can operate the first user interface 318 to display information generated by the communication system 100. The first control unit 312 can also execute the first software 326 for the other functions of the communication system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the communication system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the communication system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the communication system 100 is shown with the second storage unit 346 as a single hierarchy storage system, although it is understood that the communication system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as nonvolatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The communication system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the communication system 100 is described by operation of the first device 102 and the second device 106. It is understood that the first device 102 and the second device 106 can operate any of the modules and functions of the communication system 100. For example, the first device 102 is described to operate the location unit 320, although it is understood that the second device 106 can also operate the location unit 320.

Figure 4:
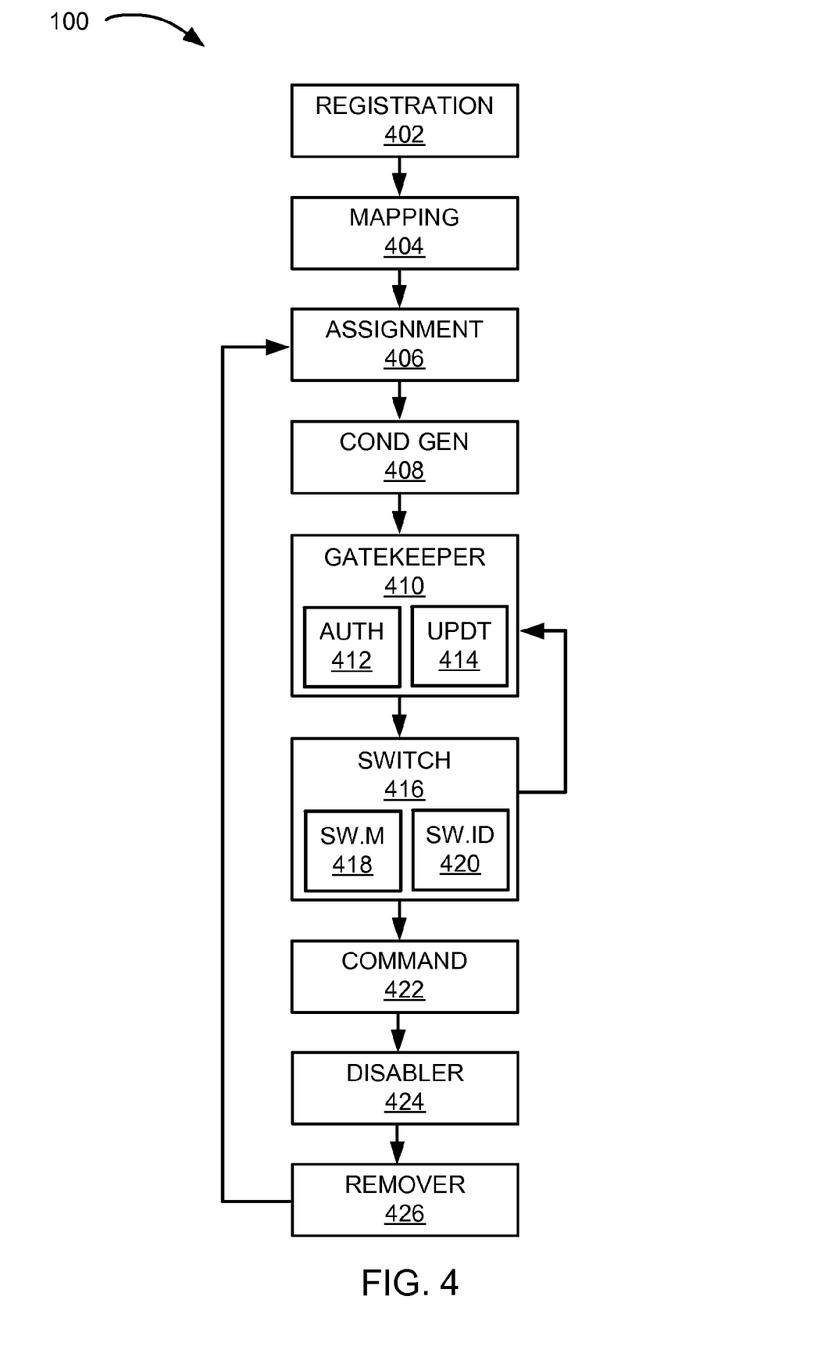
FIG. 4 is a control flow of the communication system.

Referring now to FIG. 4, therein is shown a control flow of the communication system 100. The communication system 100 can include a registration module 402. The registration module 402 registers the contact identification for the reception device 204 of FIG. 2 to the communication system 100. For example, the registration module 402 can register the primary communication identification 208 of FIG. 2 for identifying the reception device 204.

For a specific example, the primary communication identification 208 can represent a telephone number "(415) 654-3210." The registration module 402 can register "(415) 654-3210" to the communication system 100 for identifying the reception device 204.

The communication system 100 can include a mapping module 404. The mapping module 404 can be coupled to the registration module 402. The mapping module 404 generates the contact identification that can be assigned to the primary communication identification 208 for concealing the primary communication identification 208 from the transmitter. For example, the mapping module 404 can generate the map communication identification 206 of FIG. 2 associated with the primary communication identification 208.

The mapping module 404 can generate the map communication identification 206 in a number of ways. For example, the mapping module 404 can generate the map communication identification 206 representing a telephone number from a set of telephone numbers assigned by numbering plan administration, such as the North American Numbering Plan Administration (NANPA). For another example, the mapping module 404 can generate the map communication identification 206 representing an email address by creating a new email address. For a different example, the mapping module 404 can generate the map communication identification 206 representing an instant messaging identification by creating a new login name for the instant messaging service.

The communication system 100 can include an assignment module 406. The assignment module 406 can be coupled to the mapping module 404. The assignment module 406 assigns the map communication identification 206 to the primary communication identification 208. For example, the assignment module 406 can assign the map communication identification 206 to the primary communication identification 208 for contacting the reception device 204 via the map communication identification 206 instead of the primary communication identification 208.

The assignment module 406 can assign the map communication identification 206 in a number of ways. For example, the assignment module 406 can assign one of the map communication identification 206 to the primary communication identification 208. For a specific example, the assignment module 406 can assign the map communication identification 206 representing a telephone number to the primary communication identification 208 representing an instant messaging login name by mapping the telephone number to the instant messaging login name.

For a different example, the assignment module 406 can assign multiple variations of the map communication identification 206 to the primary communication identification 208. For a specific example, the assignment module 406 can assign the first map communication identification 228 of FIG. 2 representing instant messenger login name and the second map communication identification 230 of FIG. 2 representing a telephone number. The primary communication identification 208 can represent a telephone number. More specifically, the assignment module 406 can assign the first map communication identification 228 and the second map communication identification 230 by mapping the instant messaging login name and the substitution telephone number to the primary telephone number.

The communication system 100 can include a condition generator module 408. The condition generator module 408 can be coupled to the assignment module 406. The condition generator module 408 generates the authorization condition 210 for categorizing the map communication identification 206 by attributing various conditions included in the authorization condition 210 to the map communication identification 206.

For example, the condition generator module 408 can generate the authorization condition 210 of FIG. 2 for the map communication identification 206 for contacting the reception device 204. For a specific example, the condition generator module 408 can generate the authorization condition 210 based on the transmitter region 212 of FIG. 2, the time period 214 of FIG. 2, the subscription status 216 of FIG. 2, the transmission mode 218 of FIG. 2, or a combination thereof.

The condition generator module 408 can generate the authorization condition 210 in a number of ways. For example, the condition generator module 408 can select the transmitter region 212 for assigning the authorization condition 210 to the map communication identification 206 by restricting a geographic area within a predefined longitudes and latitudes. More specifically, the transmitter region 212 can be restricted within San Francisco, Calif. For further example, the authorization condition 210 can include the transmitter region 212. The transmitter region 212 can be assigned to the primary communication identification 208, as the transmitter can be restricted to contact the primary communication identification 208 only if the transmitter is within San Francisco. If the transmitter attempts to contact the reception device 204 from outside of San Francisco, the communication system 100 can deny the device access 234 of FIG. 2 to the reception device 204, as it fails to meet the authorization condition 210.

For another example, the condition generator module 408 can select the time period 214 for assigning the authorization condition 210 to the map communication identification 206 by selecting a specific time of the day. For example, the time period 214 can be restricted within 8 PM to 11 PM.

For a different example, the condition generator module 408 can select the subscription status 216 for assigning the authorization condition 210 as "basic" status. More specifically, the subscription status 216 can limit the transmitter to use the map communication identification 206 once a day to access the reception device 204. For further example, if the transmitter succeeded in establishing the device access 234 once, the subsequent attempt in the same day by the transmitter can fail because the communication system 100 can deny establishment of the device access 234 due to the subscription status 216.

For another example, the condition generator module 408 can select the transmission mode 218 for assigning the authorization condition 210 as SMS. More specifically, the transmission mode 218 can restrict the transmitter to contact the reception device 204 via the map communication identification 206 representing SMS identification. For further example, if the transmitter attempts to contact the reception device 204 via the map communication identification 206 representing a mobile phone number, the communication system 100 can deny the device access 234 based on the authorization condition 210. Details regarding the communication system 100 denying the device access 234 based on the authorization condition 210 will be discussed later.

The communication system 100 can include a gatekeeper module 410. The gatekeeper module 410 can be coupled to the condition generator module 408. The gatekeeper module 410 determines whether the access request 202 transmitted via the map communication identification 206 can access the reception device 204 based on the authorization condition 210. For example, the gatekeeper module 410 can control the device access 234 based on the authorization condition 210 for accepting the access request 202 to the reception device 204 with the map communication identification 206 instead of the primary communication identification 208. For another example, the gatekeeper module 410 can generate the access control 220 of FIG. 2 based on the authorization condition 210 for accepting the access request 202 to the reception device 204 via the map communication identification 206.

The gatekeeper module 410 can control the device access 234 in a number of ways. For example, the gatekeeper module 410 includes an authorization module 412. The authorization module 412 generates the contact authorization 222 of FIG. 2 to give the communication system 100 the ability to permit or deny the device access 234 to the reception device 204.

The authorization module 412 can generate the contact authorization 222 in a number of ways. For example, the authorization module 412 can generate the contact authorization 222 based on the authorization condition 210 for validating the access request 202 for contacting the reception device 204. For a specific example, the authorization module 412 can generate the contact authorization 222 based on the transmitter region 212, the time period 214, the subscription status 216, the transmission mode 218, or a combination thereof for managing the access request 202 to the reception device 204.

For a further example, the access control 220 can include a combination of the transmitter region 212 and the time period 214 for the authorization condition 210 as illustrated in FIG. 2. More specifically, the transmitter region 212 can represent a geographic area for the state of California and Nevada. The time period 214 can represent every Monday morning between 7 AM to 10 AM. If the transmitter calls the map communication identification 206 representing a telephone number from New York City, N.Y. or calls after 8 AM on a Tuesday in California, the authorization module 412 can be not invoked for generating the contact authorization 222 because the access request 202 failed to meet the authorization condition 210. As a result, the transmitter will fail to contact the reception device 204.

The access control 220 can include a variation of combinations of the authorization condition 210. If the combination requires all of the authorization condition 210, a failure to have one of the authorization condition 210 can lead to the no generation of the contact authorization 222. For a different example, the access control 220 can require only a set number of the authorization condition 210 to successfully generate the contact authorization 222. For example, the authorization condition 210 can include the time period 214, the subscription status 216, and the transmission mode 218. Furthermore, the authorization condition 210 can be set to require two out of three of the authorization condition 210. When the transmitter attempts to contact the reception device 204, if the time period 214 and the subscription status 216 are met but not the transmission mode 218, the contact authorization 222 can be generated to allow the device access 234 to the reception device 204.

It has been discovered that the present invention provides the communication system 100 for providing a more efficient operation of the communication system 100. The efficient operation is created by generating the access control 220 based on the authorization condition 210 for empowering the communication system 100 to manage the access request 202 to the reception device 204 by various transmitters. The management can include the controlling of the access request 202 for accessing the device based on various conditions for the authorization condition 210, such as the transmitter region 212, the time period 214, the subscription status 216, the transmission mode 218, or a combination thereof. By managing the access request 202, the communication system 100 can eliminate unwanted access to the reception device 204, thus, decreasing distraction and improving efficiency while operating the communication system 100.

The communication system 100 can include a switch module 416. The switch module 416 can be coupled to the gatekeeper module 410. The switch module 416 switches the transmission mode 218, the map communication identification 206, or a combination thereof based on the authorization condition 210 specified in the access control 220.

The switch module 416 includes a switch mode module 418. The switch mode module 418 switches the transmission mode 218 based on the authorization condition 210 specified in the access control 220. For example, the switch mode module 418 can switch from the first transmission mode 224 of FIG. 2 to the second transmission mode 226 of FIG. 2 based on the authorization condition 210 for managing the access request 202 to the reception device 204.

The switch mode module 418 can switch the transmission mode 218 in a number of ways. For example, the access control 220 can include the authorization condition 210 having the time period 214. More specifically, the time period 214 can restrict the transmission mode 218 to telephone access to the reception device 204 between 8 AM to 9 AM, but email access to the reception device 204 between 9 AM to 2 PM. The first transmission mode 224 can represent a telephone call and the second transmission mode 226 can represent an email. The transmitter can make a telephone call to the first map communication identification 228 representing a telephone number after 9 AM. As a result, the contact authorization 222 will not be generated, and the transmitter can leave the voicemail for his telephone call. The switch mode module 418 can switch from the first transmission mode 224 representing a telephone call to the second transmission mode 226 representing an email to convert the voicemail into content for an email to allow the transmitter to access the reception device 204. The conversion can include converting the audio file of the voicemail into text format file for the email.

The switch module 416 includes a switch identification module 420. The switch identification module 420 switches the map communication identification 206 based on the authorization condition 210 specified in the access control 220. For example, the switch identification module 420 can switch from the first map communication identification 228 to the second map communication identification 230 for accessing the reception device 204.

The switch identification module 420 can switch the map communication identification 206 in a number of ways. For example, the switch identification module 420 can switch the map communication identification 206 based on the authorization condition 210 representing the level of throughput of the network. For a specific example, the switch identification module 420 can set the predefined threshold for the throughput of the network to be 1 gigabit per second. If the bandwidth of the network drops below a predefined threshold, the switch identification module 420 can switch from the first map communication identification 228 to the second map communication identification 230 for utilizing a network with a better throughput.

For another example, the access control 220 can include the authorization condition 210 representing the time period 214. More specifically, the time period 214 can restrict communication via the first map communication identification 228 during the hours of 1 PM to 3 PM and the second map communication identification during the hours of 3 PM to 5 PM. The transmission mode 218 for both of the map communication identification 206 can represent a telephone call. If the transmitters makes a telephone call via the first map communication identification 228 on 2:59 PM and the telephone conversation continues after 3 PM, the switch identification module 420 can switch the map communication identification 206 from the first map communication identification 228 to the second map communication identification 230 to allow the transmitter to continue accessing the reception device 204.

The communication system 100 can include a command module 422. The command module 422 can be coupled to the switch module 416. The command module 422 generates an execution command to instruct functionality running on the reception device 204 to respond to the request made by the execution command. For example, the command module 422 can generate the device command 232 of FIG. 2 based on meeting or exceeding the contact authorization 222 for managing the access request 202 for commanding the reception device 204.

The command module 422 can generate the device command 232 in a number of ways. For example, the authorization condition 210 can include the transmitter region 212. The transmitter region 212 can include the United States. The transmission mode 218 can be set for emailing. The map communication identification 206 can be set for an email address. The transmitter can send an email from China. Since the transmitter is sending an email from outside of the United States, the contact authorization 222 will not be generated for generating the device command 232 that can command functionality within the reception device 204 to convert the email text into a voice message.

For another example, the authorization condition 210 can include the subscription status 216. The subscription status 216 can include a colleague from the same workplace. The transmission mode 218 can be instant messaging. The map communication identification 206 can be an instant messaging login name. The transmitter who is a colleague can send an instant messaging requesting an internal meeting. The command module 422 can generate the device command 232 to schedule a meeting by commanding a scheduler within the reception device 204 to block a meeting time in a scheduler software running in the reception device 204.

For illustrative purposes, the communication system 100 is described with the gatekeeper module 410 generating the contact authorization 222 based on the authorization condition 210, although it is understood the communication system 100 can operate the gatekeeper module 410 differently. For example, the gatekeeper module 410 can generate the contact authorization 222 based on receiving the access request 202 via the first transmission mode 224. For another example, the gatekeeper module 410 can update the contact authorization 222 based on receiving the access request 202 via the second transmission mode 226 for managing the access request 202 to the reception device 204.

For a specific example, the authorization module 412 can generate the contact authorization 222 based on receiving the access request 202 via the first transmission mode 224. Continuing with the previous example, the first transmission mode 224 can include instant messaging. The authorization module 412 can generate the contact authorization 222 that limits the device command 232 for scheduling a meeting for the access request 202 transmitted via the first transmission mode 224.

The gatekeeper module 410 includes an update module 414. The update module 414 can update the contact authorization 222 based on receiving the access request 202 via the second transmission mode 226 for managing the access request 202 to the reception device 204. For example, the same transmitter can send via the second transmission mode 226 that is an email. The update module 414 can update the contact authorization 222 that enhances the device command 232 by allowing not only the ability to schedule a meeting, but also allow the access to the documents stored in the reception device 204 by, for example, opening the document in the reception device 204.

The communication system 100 can include a disabler module 424. The disabler module 424 can be coupled to the command module 422. The disabler module 424 disables the map communication identification 206. For example, the disabler module 424 can disable the map communication identification 206 for disallowing the communication to the reception device 204 via the map communication identification 206.

The disabler module 424 can disable the map communication identification 206 in a number of ways. For example, the disabler module 424 can deactivate the map communication identification 206 to prevent the transmitter from using the map communication identification 206 to access the reception device 204. For another example, the disabler module 424 can suspend the map communication identification 206. For further example, even though the transmitter can attempt to make the access request 202, the communication system 100 can temporarily deny the transmitter from successfully using the map communication identification 206 to access the reception device 204. More specifically, even if the transmitter attempts to use the map communication identification 206, the authorization module 412 can be not invoked to generate the contact authorization 222.

The communication system 100 can include a remover module 426. The remover module 426 can be coupled to the disabler module 424. The remover module 426 removes the map communication identification 206. For example, the remover module 426 can remove the map communication identification 206 assigned to the primary communication identification 208. For a specific example, the disabler module 424 can delete the map communication identification 206 from a mapping list that maps between the map communication identification 206 and the primary communication identification 208.

The physical transformation from generating the access control 220 results in movement in the physical world, such as people using the map communication identification 206 within or outside of the transmitter region 212, the time period 214, or a combination thereof As the movement in the physical world occurs, the movement itself creates additional information that is converted back to the device access 234, for the continued operation of the communication system 100 and to continue movement in the physical world.

The first software 326 of FIG. 3 of the first device 102 of FIG. 3 can include the communication system 100. For example, the first software 326 can include the registration module 402, the mapping module 404, the assignment module 406, the condition generator module 408, the gatekeeper module 410, the switch module 416, the command module 422, the disabler module 424, and the remover module 426.

The first control unit 312 of FIG. 3 can execute the first software 326 for the registration module 402 to register the primary communication identification 208. The first control unit 312 can execute the first software 326 for the mapping module 404 to generate the map communication identification 206. The first control unit 312 can execute the first software 326 for the assignment module 406 to assign the map communication identification 206 to the primary communication identification 208.

The first control unit 312 can execute the first software 326 for the condition generator module 408 to generate the authorization condition 210. The first control unit 312 can execute the first software 326 for the gatekeeper module 410 to control the device access 234. The first control unit 312 can execute the first software 326 for the switch module 416 to switch the transmission mode 218, the map communication identification 206, or a combination thereof The first control unit 312 can execute the first software 326 for the command module 422 to generate the device command 232. The first control unit 312 can execute the first software 326 for the disabler module 424 to disable the map communication identification 206. The first control unit 312 can execute the first software 326 for the remover module 426 to remove the map communication identification 206.

The second software 342 of FIG. 3 of the second device 106 of FIG. 3 can include the communication system 100. For example, the second software 342 can include the registration module 402, the mapping module 404, the assignment module 406, the condition generator module 408, the gatekeeper module 410, the switch module 416, the command module 422, the disabler module 424, and the remover module 426.

The second control unit 334 of FIG. 3 can execute the second software 342 for the registration module 402 to register the primary communication identification 208. The second control unit 334 can execute the second software 342 for the mapping module 404 to generate the map communication identification 206. The second control unit 334 can execute the second software 342 for the assignment module 406 to assign the map communication identification 206 to the primary communication identification 208.

The second control unit 334 can execute the second software 342 for the condition generator module 408 to generate the authorization condition 210. The second control unit 334 can execute the second software 342 for the gatekeeper module 410 to control the device access 234. The second control unit 334 can execute the second software 342 for the switch module 416 to switch the transmission mode 218, the map communication identification 206, or a combination thereof. The second control unit 334 can execute the second software 342 for the command module 422 to generate the device command 232. The second control unit 334 can execute the second software 342 for the disabler module 424 to disable the map communication identification 206. The second control unit 334 can execute the second software 342 for the remover module 426 to remove the map communication identification 206.

The communication system 100 can be partitioned between the first device 102 and the second device 106. For example, the communication system 100 can be partitioned into the functional units of the first device 102, the second device 106, or a combination thereof. The communication system 100 can also be implemented as additional functional units in the first device 102, the second device 106, or a combination thereof As another example, the communication system 100 can be partitioned between the first software 326 and the second software 342. For example, the second software 342 can include the registration module 402, the mapping module 404, the assignment module 406, the condition generator module 408, the gatekeeper module 410, the switch module 416, the command module 422, and the disabler module 424. The second control unit 334 can execute modules partitioned on the second software 342 as previously described.

The first software 326 can include the remover module 426. Based on the size of the first storage unit 314, the first software 326 can include additional modules of the communication system 100. The first control unit 312 can execute the modules partitioned on the first software 326 as previously described.

The first control unit 312 can operate the first communication unit 316 to receive the device command 232 from the second device 106. The first control unit 312 can operate the first software 326 to operate the location unit 320. The second communication unit 336 of FIG. 3 can send the device command 232 to the first device 102 through the communication path 104 of FIG. 3.

It has yet further been discovered that the present invention provides the communication system 100 for providing security measures for the operation of the communication system 100. The security measure is created by generating the access control 220 based on the authorization condition 210 for empowering the communication system 100 to manage the access request 202 to the reception device 204 by various transmitters. The transmitters that failed to meet or exceed the authorization condition 210 will fail to have the device access 234 to contact the reception device 204, because the contact authorization 222 will not be generated. The selective generation of the contact authorization 222 enhances security to prevent unauthorized access to the reception device 204.

The communication system 100 describes the module functions or order as an example. The modules can be partitioned differently. For example, the assignment module 406 and the mapping module 404 can be combined.

Furthermore, data generated in one module can be used by another module without being directly coupled to each other. For example, the command module 422 can directly receive the contact authorization 222 from the authorization module 412.

Moreover, the modules described above can be implemented in hardware and should be considered as hardware functional units in addition to those described in FIG. 3, embedded into the functional units described in FIG. 3, or a combination thereof. For the purposes of this application, the modules are hardware implementation when claimed in apparatus claims.

Figure 5:
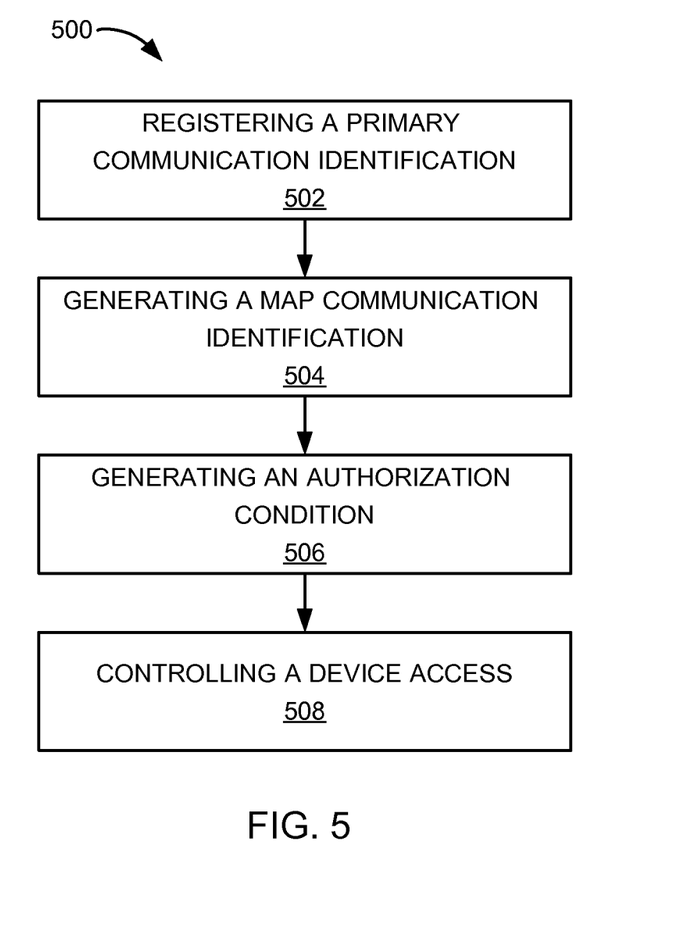
FIG. 5 is a flow chart of a method of operation of the communication system in a further embodiment of the present invention.

Referring now to FIG. 5, therein is shown a flow chart of a method 500 of operation of the communication system 100 in a further embodiment of the present invention. The method 500 includes: registering a primary communication identification for identifying a reception device in a block 502; generating a map communication identification associated with the primary communication identification in a block 504; generating an authorization condition for the map communication identification for contacting the reception device in a block 506; and controlling a device access based on the authorization condition for accepting an access request to the reception device with the map communication identification instead of the primary communication identification in a block 508.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a communication system comprising:
registering a primary communication identification for identifying a reception device;
generating a map communication identification associated with the primary communication identification;
generating an authorization condition for the map communication identification for contacting the reception device;
controlling a device access based on the authorization condition for accepting an access request to the reception device with the map communication identification instead of the primary communication identification; and
switching from a first transmission mode to a second transmission mode based on the authorization condition for managing the access request for the device access to the reception device.

2. The method as claimed in claim 1 further comprising:
disabling the map communication identification; and
removing the map communication identification assigned to the primary communication identification.

3. The method as claimed in claim 1 wherein controlling the device access includes:
generating a contact authorization based on the authorization condition for validating the access request for contacting the reception device; and further comprising:
generating a device command based on meeting or exceeding the contact authorization for managing the access request for commanding the reception device.

4. The method as claimed in claim 1 wherein controlling the device access includes:
generating a contact authorization based on receiving the access request via a first transmission mode; and further comprising:
updating the contact authorization based on receiving the access request via a second transmission mode different from the first transmission mode for managing the access request to the reception device.

5. A method of operation of a communication system comprising:
registering a primary communication identification for identifying a reception device;
generating a map communication identification associated with the primary communication identification;
generating an authorization condition for the map communication identification for contacting the reception device;
controlling a device access based on the authorization condition for accepting an access request to the reception device with the map communication identification instead of the primary communication identification;
switching from a first transmission mode to a second transmission mode based on the authorization condition for managing the access request to the reception device; and
generating a device command based on the device access for managing the access request received via the first transmission mode or the second transmission mode for commanding the reception device.

6. The method as claimed in claim 5 wherein generating the authorization condition includes:
selecting a transmitter region for the authorization condition; and further comprising:
generating a contact authorization based on the transmitter region for managing the access request to the reception device.

7. The method as claimed in claim 5 wherein generating the authorization condition includes:
selecting a time period for the authorization condition; and further comprising:
generating a contact authorization based on the time period for managing the access request to the reception device.

8. The method as claimed in claim 5 wherein generating the authorization condition includes:
selecting a subscription status for the authorization condition; and further comprising:
generating a contact authorization based on the subscription status for managing the access request to the reception device.

9. The method as claimed in claim 5 wherein generating the authorization condition includes:
selecting a transmission mode for the authorization condition; and further comprising:
generating a contact authorization based on the transmission mode for managing the access request to the reception device.

10. A communication system comprising:
a control unit for:
registering a primary communication identification for identifying a reception device,
generating a map communication identification associated with the primary communication identification,
generating an authorization condition for the map communication identification for contacting the reception device,
controlling a device access based on the authorization condition for accepting an access request to the reception device with the map communication identification instead of the primary communication identification,
switching from a first transmission mode to a second transmission mode based on the authorization condition for managing the access request for the device access to the reception device, and
a communication unit, coupled to the control unit, for sending a device command to the reception device.

11. The system as claimed in claim 10 wherein the control unit is for:
disabling the map communication identification; and
removing the map communication identification assigned to the primary communication identification.

12. The system as claimed in claim 10 wherein the control unit is for:
generating a contact authorization based on the authorization condition includes the access request validated for contacting the reception device; and
generating the device command based on meeting or exceeding the contact authorization includes the access request managed for commanding the reception device.

13. The system as claimed in claim 10 wherein the control unit is for:
generating a contact authorization based on receiving the access request via a first transmission mode; and
updating the contact authorization based on receiving the access request via a second transmission mode for managing the access request to the reception device.

14. The system as claimed in claim 10 wherein the control unit is for generating the device command based on the device access includes the access request managed for commanding the reception device.

15. The system as claimed in claim 14 wherein the control unit is for:
selecting a transmitter region for assigning the authorization condition; and
generating a contact authorization based on the transmitter region for managing the access request to the reception device.

16. The system as claimed in claim 14 wherein the control unit is for:
selecting a time period for assigning the authorization condition; and
generating a contact authorization based on the time period for managing the access request to the reception device.

17. The system as claimed in claim 14 wherein the control unit is for:
selecting a subscription status for assigning the authorization condition; and
generating a contact authorization based on the subscription status for managing the access request to the reception device.

18. The system as claimed in claim 14 wherein the control unit is for:
selecting a transmission mode for assigning the authorization condition; and
generating a contact authorization based on the transmission mode for managing the access request to the reception device.

* * * * *